(12) United States Patent
Goslin et al.

(10) Patent No.: US 9,972,138 B2
(45) Date of Patent: *May 15, 2018

(54) SYSTEMS AND METHODS FOR AUGMENTING AN APPEARANCE OF A HILT TO SIMULATE A BLADED WEAPON

(71) Applicant: Disney Enterprises, Inc., Burbank, CA (US)

(72) Inventors: Michael P. Goslin, Burbank, CA (US); Matthew Ryan, Burbank, CA (US); Joseph Logan Olson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/704,441

(22) Filed: Sep. 14, 2017

(65) Prior Publication Data

US 2018/0005452 A1 Jan. 4, 2018

Related U.S. Application Data

(63) Continuation of application No. 15/001,160, filed on Jan. 19, 2016.

(51) Int. Cl.
*G06T 19/00* (2011.01)
*G06F 3/01* (2006.01)

(52) U.S. Cl.
CPC ............ *G06T 19/006* (2013.01); *G06F 3/016* (2013.01); *G06F 3/017* (2013.01)

(58) Field of Classification Search
None
See application file for complete search history.

(56) References Cited

U.S. PATENT DOCUMENTS

| 6,162,123 | A | * | 12/2000 | Woolston | A63F 13/10 |
| | | | | | 273/148 B |
| 2007/0126700 | A1 | * | 6/2007 | Wright | G06F 3/0317 |
| | | | | | 345/161 |
| 2007/0252815 | A1 | * | 11/2007 | Kuo | A63F 13/06 |
| | | | | | 345/158 |
| 2010/0261526 | A1 | * | 10/2010 | Anderson | G06F 3/016 |
| | | | | | 463/31 |
| 2012/0262365 | A1 | | 10/2012 | Mallinson | |
| 2014/0002329 | A1 | * | 1/2014 | Nishimaki | G06K 7/1404 |
| | | | | | 345/8 |
| 2014/0104169 | A1 | * | 4/2014 | Masselli | G01B 11/00 |
| | | | | | 345/157 |
| 2015/0243286 | A1 | | 8/2015 | Goslin | |

(Continued)

*Primary Examiner* — Hilina K Demeter
(74) *Attorney, Agent, or Firm* — Sheppard Mullin Richter & Hampton LLP

(57) ABSTRACT

This disclosure relates to systems and methods for augmenting an appearance of a hilt to simulate a bladed weapon. A hilt may be augmented with a blade of a bladed weapon by detecting a landmark associated with the hilt, determining a position and/or an orientation of the hilt, determining an overlay image comprising the blade of the bladed weapon, wherein the blade is placed within the overlay image according to the determined position and/or the determined orientation of the hilt, and displaying the overlay image so that the blade of the bladed weapon appears to be attached to the hilt.

20 Claims, 10 Drawing Sheets

(56) References Cited

U.S. PATENT DOCUMENTS

| | | | |
|---|---|---|---|
| 2016/0189411 A1* | 6/2016 | Matsunaga | G06T 11/60 345/634 |
| 2016/0206957 A1* | 7/2016 | Goslin | A63F 13/428 |
| 2016/0253842 A1* | 9/2016 | Shapira | G02B 27/017 345/633 |
| 2016/0274662 A1* | 9/2016 | Rimon | G06F 3/014 |
| 2017/0203225 A1 | 7/2017 | Goslin | |

* cited by examiner

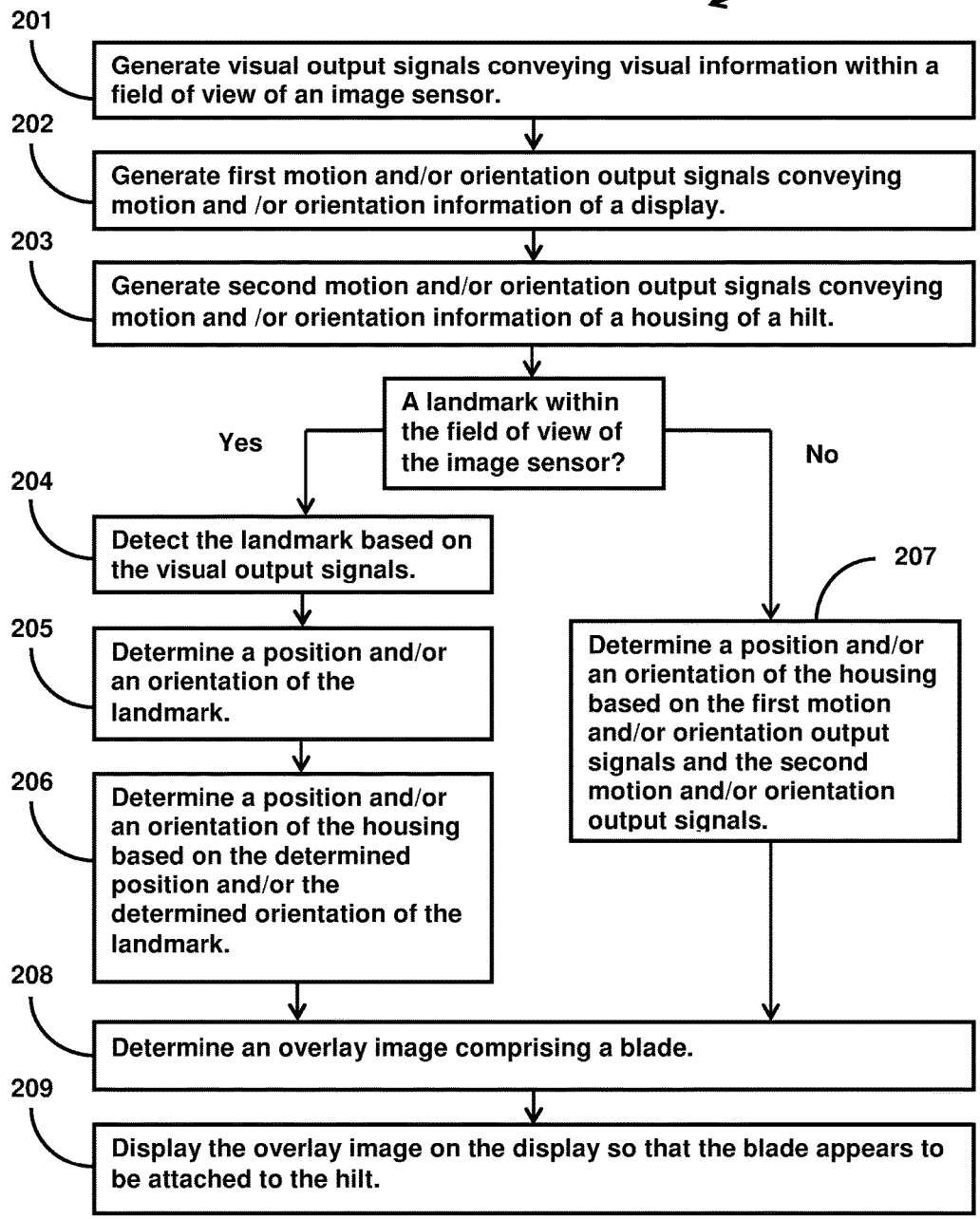

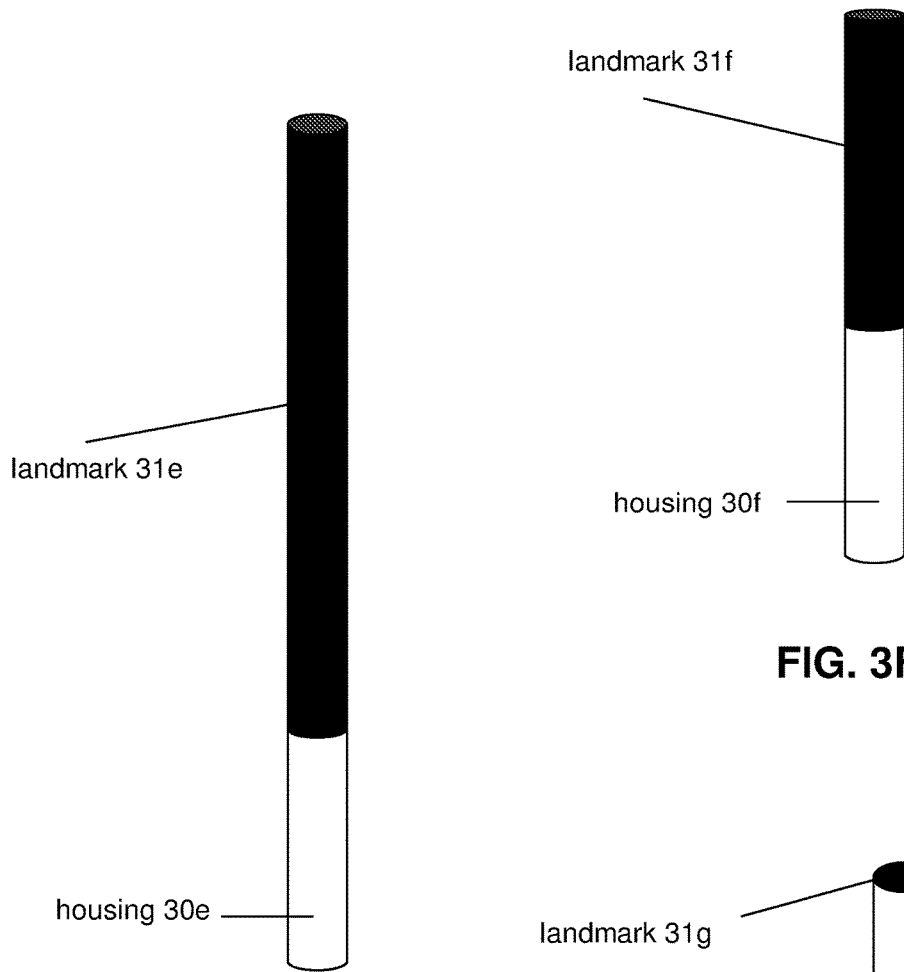

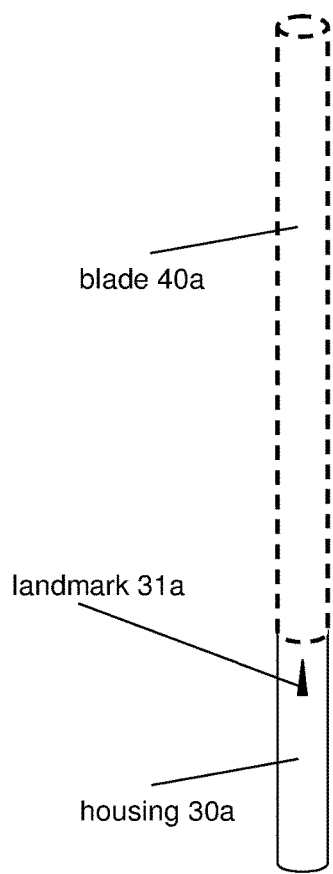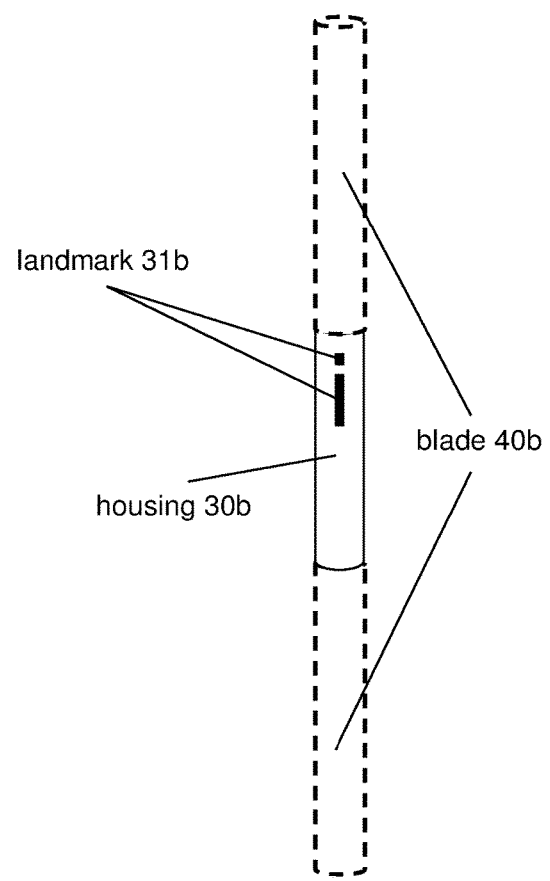
FIG. 4A
FIG. 4B

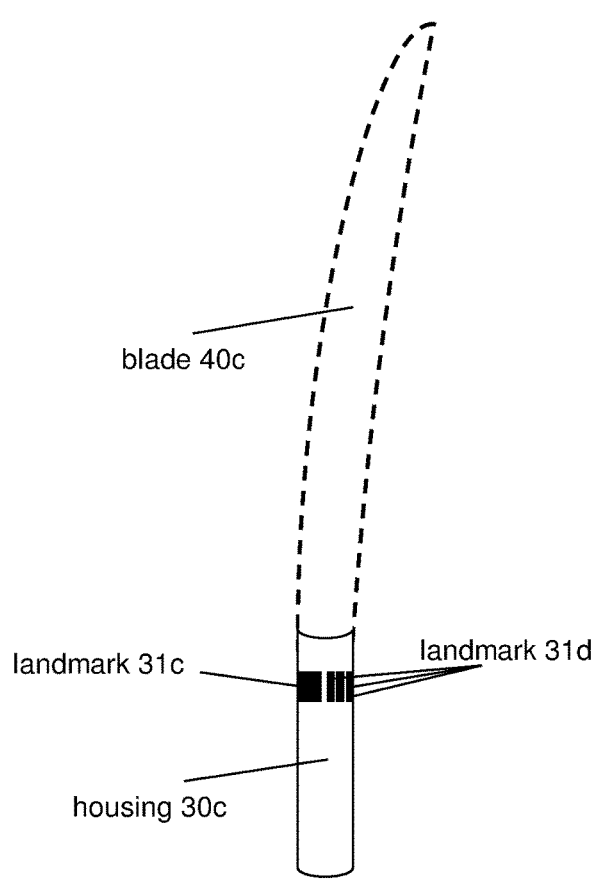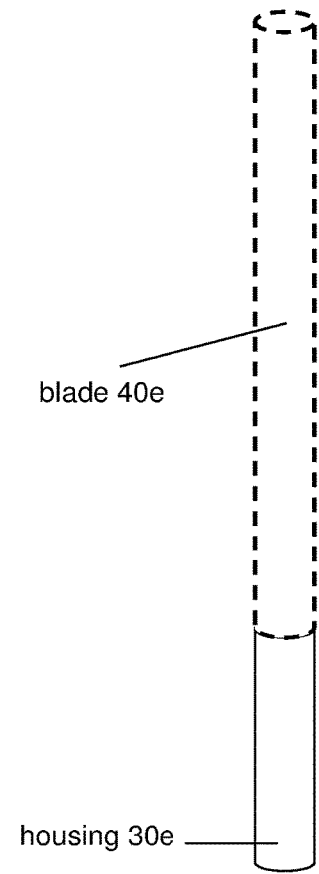
FIG. 4C
FIG. 4D

SYSTEMS AND METHODS FOR AUGMENTING AN APPEARANCE OF A HILT TO SIMULATE A BLADED WEAPON

FIELD

This disclosure relates to systems and methods for augmenting an appearance of a hilt to simulate a bladed weapon.

BACKGROUND

Toy weapons that include a hilt and a blade are known. Such toys do not allow a person to view the hilt of the toy augmented by a virtual blade of a bladed weapon.

SUMMARY

This disclosure relates to augmenting an appearance of a hilt to simulate a bladed weapon. A hilt may be augmented with a blade of a bladed weapon by detecting a landmark associated with the hilt, determining a position and/or an orientation of the hilt, determining an overlay image comprising the blade of the bladed weapon, wherein the blade is placed within the overlay image according to the determined position and/or the determined orientation of the hilt, and displaying the overlay image so that the blade of the bladed weapon appears to be attached to the hilt.

A system configured to augment an appearance of a hilt to simulate a bladed weapon may include a display, an image sensor, a housing of the hilt, a landmark carried by the housing, a first motion and orientation sensor, a second motion and orientation sensor, one or more processors, and/or other components. In some implementations, the system may include a haptic generator. In some implementations, the system may include a speaker. In some implementations, the image sensor and the one or more processors may be carried on the display, and the field of view of the image sensor may be a function of the position and the orientation of the display.

The display may be configured to display an overlay image. In some implementations, the display may include one or more of a head-mounted display, an optical head-mounted display, a see-through display, an optical see-through display, a video see-through display, a visor, eyeglasses, sunglasses, a smartphone, a tablet, a mobile device, a projector, and/or other displays.

The image sensor may be configured to generate visual output signals conveying visual information within a field of view of the image sensor. The image sensor may include one or more of a charge-coupled device sensor, an active pixel sensor, a complementary metal-oxide semiconductor sensor, an N-type metal-oxide-semiconductor sensor, and/or other image sensors.

The hilt may include a housing. The landmark may be carried by the housing. The landmark may indicate a reference point for the hilt that facilitates determination of a position and/or an orientation of the housing. In some implementations, the landmark may include a light emitting diode and/or other landmarks.

The first motion and orientation sensor may be carried by the display. The first motion and orientation sensor may be configured to generate first motion and/or orientation output signals conveying motion and/or orientation information of the display. The second motion and orientation sensor may be carried by the housing. The second motion and orientation sensor may be configured to generate second motion and/or orientation output signals conveying motion and/or orientation information of the housing. In some implementations, the first motion and orientation sensor and the second motion and orientation sensor may include an inertial measurement unit and/or other motion and orientation sensors.

When a landmark is within the field of view of the image sensor, the one or more processors may be configured to detect the landmark based on the visual output signals. The one or more processors may be configured to determine a position and/or an orientation of the landmark. The one or more processors may configured to determine a position and/or an orientation of the housing based on the determined position and/or the determined orientation of the landmark.

When a landmark is not within the field of view of the image sensor, the one or more processors may be configured to determine the position and/or the orientation of the housing based on the first motion and/or orientation output signals and the second motion and/or orientation output signals.

In some implementations, the one or more processors may be configured to select the blade of the bladed weapon based on a user input received through an input device. An input device may include a key entry device, a touch entry device, an imaging device, a sound device, and/or other input devices. In some implementations, the one or more processors may be configured to select the blade of the bladed weapon based on the landmark. In some implementations, the one or more processors may be configured to select the blade of the bladed weapon based on remotely received information.

The one or more processors may be configured to determine an overlay image. The overlay image may comprise a blade of a bladed weapon. The blade of the bladed weapon may be placed within the overlay image according to the determined position and/or the determined orientation of the housing.

The one or more processors may be configured to effectuate displaying of the overlay image on the display. The displaying may be effectuated so that the blade appears to be attached to the hilt.

In some implementations, the one or more processors may be configured to detect an object based on the visual output signals. The one or more processors may be configured to determine when the blade of the bladed weapon touches the object. The one or more processors may be configured to determine the overlay image to further include a visual effect based on the blade of the bladed weapon touching the object. In some implementations, the object may include a second blade of a second hilt.

In some implementations, the one or more processors may be configured to effectuate operation of the haptic generator. The operation of the haptic generator may be effectuated in response to a movement of the hilt based on one or more of the visual output signals and/or the second motion and/or orientation output signals.

In some implementations, the one or more processors may be configured to effectuate operation of the speaker. The operation of the speaker may be effectuated in response to a movement of the hilt based on one or more of the visual output signals and/or the second motion and/or orientation output signals.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates a method to augment an appearance of a hilt to simulate a bladed weapon.

FIGS. 3A-3G illustrate examples of landmarks on housings of hilts.

FIGS. 4A-4E illustrate examples of blades of bladed weapons augmenting the appearances of hilts.

DETAILED DESCRIPTION

Figure 1:
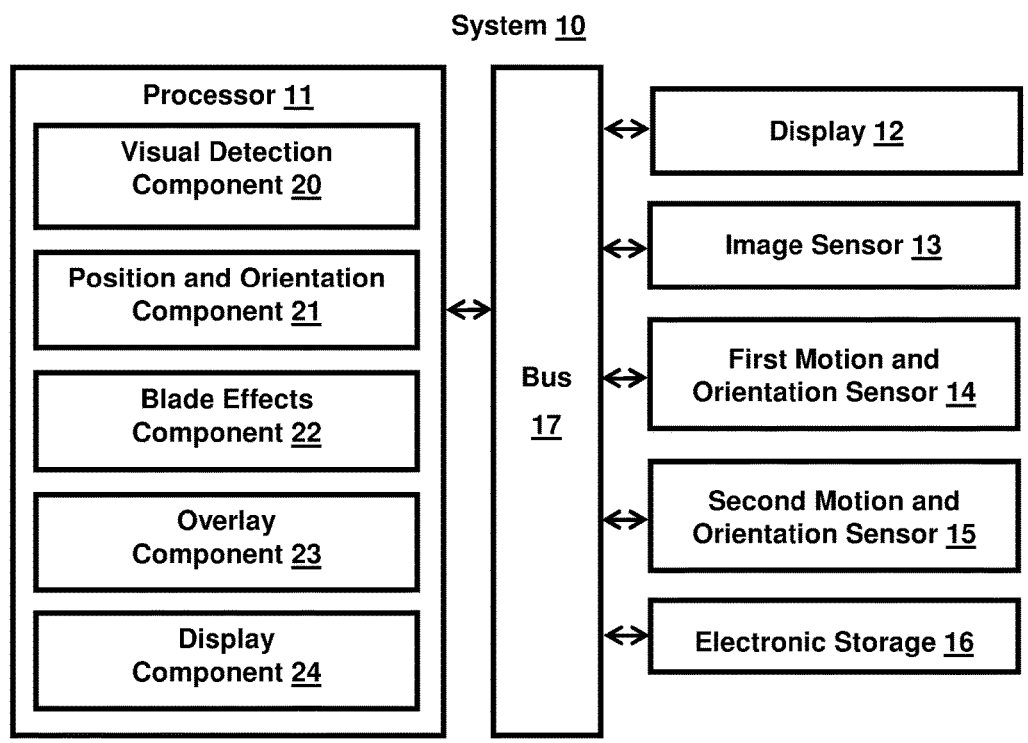
FIG. 1 illustrates a system configured to augment an appearance of a hilt to simulate a bladed weapon.

FIG. 1 illustrates a system 10 configured to augment an appearance of a hilt to simulate a bladed weapon. System 10 may include one or more of processor 11, display 12, image sensor 13, first motion and orientation sensor 14, second motion and orientation sensor 15, electronic storage 16, bus 17, a housing of the hilt, and/or other components. To augment an appearance of the hilt, a landmark may be detected, and the position and/or the orientation of the landmark may be determined. The landmark may indicate a reference point for the hilt that facilitates determination of the position and/or the orientation of the housing of the hilt. The position and/or the orientation of the housing of the hilt may be determined. A blade of a bladed weapon may be selected and placed within an overlay image according to the determined position and/or the determined orientation of the hilt. The overlay image may be displayed so that the blade of the bladed weapon appears to be attached to the hilt. In some implementations, system 10 may include a haptic generator. In some implementations, system 10 may include a speaker.

Display 12 may be configured to display an overlay image. In some implementations, display 12 may include one or more of a head-mounted display, an optical head-mounted display, a see-through display, an optical see-through display, a video see-through display, a visor, eyeglasses, sunglasses, a smartphone, a tablet, a mobile device, a projector, and/or other displays. In some implementations, processor 11 and image sensor 13 may be carried on display 12, and the field of view of image sensor 13 may be a function of the position and the orientation of display 12.

Image sensor 13 may be configured to generate visual output signals conveying visual information within the field of view of image sensor 13. Visual information may include one or more of an image, a video, and/or other visual information. When a landmark is within the field of view of image sensor 13, visual information may include one or more of an image, a video, and/or other visual information regarding the landmark. Image sensor 13 may include one or more of a charge-coupled device sensor, an active pixel sensor, a complementary metal-oxide semiconductor sensor, an N-type metal-oxide-semiconductor sensor, and/or other image sensors.

The hilt may include a housing. The housing may be configured to carry (e.g., attach to, support, hold, and/or otherwise carry) one or more components of system 10. A landmark may be carried by the housing. The landmark may indicate a reference point for the hilt that facilitates determination of a position and/or an orientation of the housing. In some implementations, the landmark may include a light emitting diode and/or other landmarks.

Figure 3A:
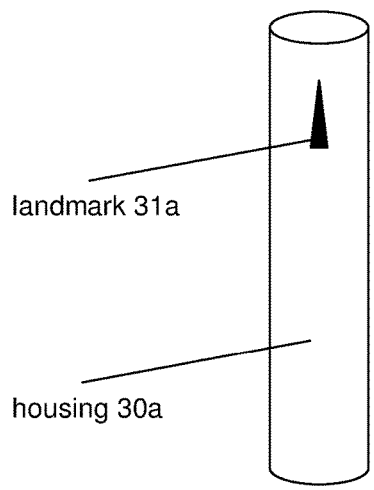
Figure 3B:
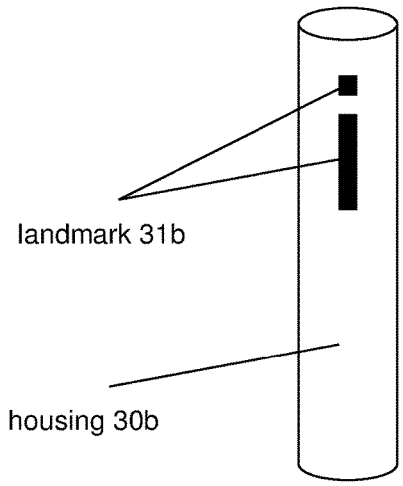
Figure 3C:
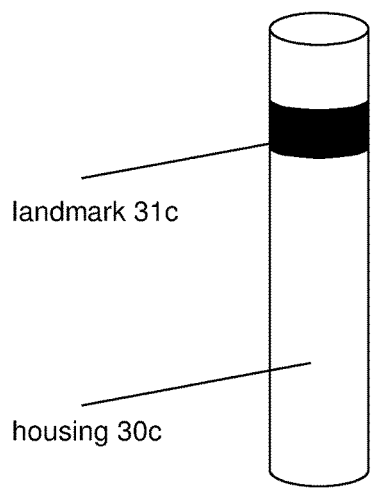
Figure 3D:
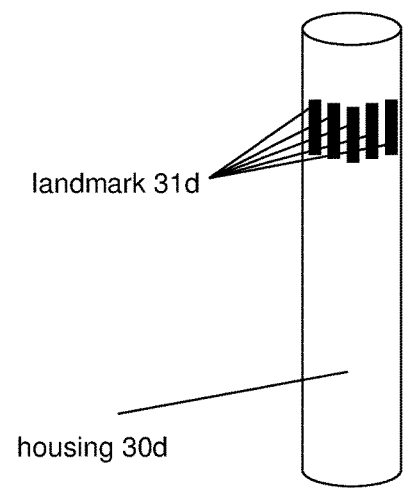

FIGS. 3A-3G provide non-limiting examples of landmarks 31 on housings 30 of hilts. In FIG. 3A, housing 30a includes landmark 31a, and landmark 31a is triangular in shape. In FIG. 3B, housing 30b includes landmark 31b, and landmark 31b looks like an upside-down exclamation mark. In FIG. 3C, housing 30c includes landmark 31c, and landmark 31c is a rectangular band running around housing 30c. In FIG. 3D, housing 30d includes landmark 31d, and landmark 31d looks like long rectangles running around housing 30d. In FIG. 3E, housing 30e includes landmark 31e, and landmark 31e is a cylindrical blade attached to housing 30e. In FIG. 3F, housing 30f includes landmark 31f, and landmark 31f is a short cylindrical blade attached to housing 30f. In FIG. 3G, housing 30g includes landmark 31g, and landmark 31g is a rounded diffuser attached to housing 30g. Landmarks in FIGS. 3A-3G may include one or more light emitting diodes and/or other lighting elements. Other shapes, types, and configurations of landmarks are contemplated.

In some implementations, a housing may include multiples types of landmarks. For example, housing 30c may include landmark 31c (shown in FIG. 3C) on the front and landmark 31d (shown in FIG. 3D) on the back. Other combinations of landmarks are contemplated.

First motion and orientation sensor 14 may be carried by display 12. First motion and orientation sensor 14 may be configured to generate first motion and/or orientation output signals conveying motion and/or orientation information of display 12. Motion and/or orientation information of display 12 may characterize one or more motion and/or orientation of display 12. Motion of display 12 may include one or more of movement of display 12, change in position of display 12, and/or other motion of display 12 at a time or over a period of time. In some implementations, motion of display 12 may include distance between display 12 and the housing at a time or over a period of time. Orientation of display 12 may include one or more of yaw, pitch, and/or roll of display 12, change in yaw, pitch, and/or roll of display 12, and/or other orientation of display 12 at a time or over a period of time.

Second motion and orientation sensor 15 may be carried by the housing of the hilt. Second motion and orientation sensor 15 may be configured to generate second motion and/or orientation output signals conveying motion and/or orientation information of the housing. Motion and/or orientation information of the housing may characterize one or more motion and/or orientation of the housing. Motion of the housing may include one or more of movement of the housing, change in position of the housing, and/or other motion of the housing at a time or over a period of time. In some implementations, motion of the housing may include distance between display 12 and the housing at a time or over a period of time. Orientation of the housing may include one or more of yaw, pitch, and/or roll of the housing, change in yaw, pitch, and/or roll of the housing, and/or other orientation of the housing at a time or over a period of time.

In some implementations, first motion and orientation sensor 14 and second motion and orientation sensor 15 may include an inertial measurement unit and/or other motion and orientation sensors. An inertial measurement unit may include one or more of accelerometers, gyroscopes, magnetometers, and/or other motion and orientation sensors. An inertial measurement unit may include one or more of 3-DOF inertial measurement units, 6-DOF inertial measurement units, 9-DOF inertial measurement units, and/or other inertial measurement units. In some implementations, first motion and orientation sensor 14 and/or second motion and orientation sensor 15 may include one or more distance sensors, such as infrared distance sensors, Lidar, ultrasonic distance sensors, and/or other distance sensors.

Electronic storage 16 may include electronic storage media that electronically stores information. Electronic storage 16 may store software algorithms, information determined by processor 11, information received remotely, and/or other information that enables system 10 to function properly. For example, electronic storage 16 may store visual information (as discussed elsewhere herein), information relating to blades of bladed weapons, information relating to landmarks, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more computer program components. The computer program components may include one or more of visual detection component 20, position and orientation component 21, blade effects component 22, overlay component 23, display component 24, and/or other components.

When a landmark is within the field of view of image sensor 13, visual detection component 20 may be configured to detect the landmark. The landmark may be detected based on the visual output signals conveying visual information within the field of view of image sensor 13.

Visual detection component 20 may be configured to determine a position and/or an orientation of the landmark. Visual detection component 20 may determine a position and/or an orientation of the landmark based on visual output signals conveying visual information within the field of view of image sensor 13. The landmark may indicate a reference point for the housing that facilitates determination of the position and/or the orientation (yaw, pitch, and/or roll) of the housing.

Position and orientation component 21 may be configured to determine a position and/or an orientation of the housing based on the determined position and/or the determined orientation of the landmark. Position and orientation component 21 may include or retrieve information (for example, a database, etc.) that matches a detected landmark to a position and/or an orientation of a housing relative to the determined position and/or the determined orientation of the landmark. For example, position and orientation component 21 may determine the position of a housing based on the determined position of a landmark, and/or the orientation of the housing based on the determined orientation of the landmark.

For example, visual detection component 20 may detect landmark 31a (shown in FIG. 3A) and determine a position and/or an orientation of landmark 31a. Position and orientation component 21 may determine a position and/or an orientation of housing 30a based on the determined position and/or the determined orientation of landmark 31a. Landmark 31a may indicate the position and/or orientation of housing 30a. For example, the position of housing 30a may be indicated by certain distances from landmark 31a (e.g., the right, left, top, and/or bottom positions of housing 30a are determined by certain distances to the right, left, above, and/or below landmark 31a). The orientation of housing 30a may be indicated by the orientation of landmark 31a (e.g., the pointed end of landmark 31a points toward the top of housing 30a).

As another example, visual detection component 20 may detect landmark 31b (shown in FIG. 3B) and determine a position and/or an orientation of landmark 31b. Position and orientation component 21 may determine a position and/or an orientation of housing 30b based on the determined position and/or the determined orientation of landmark 31b. Landmark 31b may indicate the position and/or orientation of housing 30b. For example, the position of housing 30b may be indicated by certain distances from landmark 31b (e.g., the right, left, top, and/or bottom positions of housing 30b are determined by certain distances to the right, left, above, and/or below landmark 31b). The orientation of housing 30b may be indicated by the orientation of landmark 31b (e.g., the dot-side of landmark 31b points toward the top of housing 30b).

As another example, visual detection component 20 may detect both landmark 31c (shown in FIG. 3C) and landmark 31d (shown in FIG. 3D) on housing 30c and determine positions and/or orientations of landmark 31c and landmark 31d. Position and orientation component 21 may determine a position and/or an orientation of housing 30c based on the determined position(s) and/or the determined orientation(s) of landmark 31c and/or landmark 31d. Landmark 31c and landmark 31d may indicate the position and/or orientation of housing 30c. For example, the position of housing 30c may be indicated by certain distances from landmark 31c and/or landmark 31d (e.g., the right, left, top, and/or bottom positions of housing 30c are determined by certain distances to the right, left, above, and/or below landmark 31c and/or landmark 31d). The orientation of housing 30c may be indicated by the orientation of landmark 31c and/or landmark 31d (e.g., the end of housing 30c close to landmark 31c and/or landmark 31d is the top of housing 30c, the front of housing 30c is indicated by landmark 31c, and the back of housing 30c is indicated by landmark 31d).

As another example, visual detection component 20 may detect landmark 31e (shown in FIG. 3E) and determine a position and/or an orientation of landmark 31e. Position and orientation component 21 may determine a position and/or an orientation of housing 30e based on the determined position and/or the determined orientation of landmark 31e. Landmark 31e may indicate the position and/or orientation of housing 30e. For example, the position of housing 30e may be indicated by certain distances from landmark 31e (e.g., the right, left, top, and/or bottom positions of housing 30e are determined by certain distances to the right, left, above, and/or below landmark 31e). The orientation of housing 30e may be indicated by the orientation of landmark 31e (e.g., the end of housing 30e attached to landmark 31e is the top of housing 31e).

As another example, visual detection component 20 may detect landmark 31f (shown in FIG. 3F) and determine a position and/or an orientation of landmark 31f. Position and orientation component 21 may determine a position and/or an orientation of housing 30f based on the determined position and/or the determined orientation of landmark 31*f*. Landmark 31*f* may indicate the position and/or orientation of housing 30*f*. For example, the position of housing 30*f* may be indicated by certain distances from landmark 31*f* (e.g., the right, left, top, and/or bottom positions of housing 30*f* are determined by certain distances to the right, left, above, and/or below landmark 31*f*). The orientation of housing 30*f* may be indicated by the orientation of landmark 31*f* (e.g., the end of housing 30*f* attached to landmark 31*f* is the top of housing 31*f*).

As another example, visual detection component 20 may detect landmark 31*g* (shown in FIG. 3G) and determine a position and/or an orientation of landmark 31*g*. Position and orientation component 21 may determine a position and/or an orientation of housing 30*g* based on the determined position and/or the determined orientation of landmark 31*g*. Landmark 31*g* may indicate the position and/or orientation of housing 30*g*. For example, the position of housing 30*g* may be indicated by certain distances from landmark 31*g* (e.g., the right, left, top, and/or bottom positions of housing 30*g* are determined by certain distances to the right, left, above, and/or below landmark 31*g*). The orientation of housing 30*g* may be indicated by the orientation of landmark 31*g* (e.g., the end of housing 30*g* attached to landmark 31*g* is the top of housing 31*g*).

When a landmark is not within the field of view of image sensor 13, position and orientation component 21 may be configured to determine a position and/or an orientation of the housing based on the first motion and/or orientation output signals and the second motion and/or orientation output signals. Position and orientation component 21 may determine changes in position and/or orientation of display 12 based on the first motion and/or orientation output signals. Position and orientation component 21 may determine changes in position and/or orientation of the housing based on the second motion and/or orientation output signals. Position and orientation component 21 may determine the position and/or the orientation of the housing with respect to display 12 based on the determined changes in position and/or orientation of display 12 and the determined changes in position and/or orientation of the housing. In some implementations, position and orientation component 21 may determine the distance between the housing and display 12 based on the first motion and/or orientation output signals and/or the second motion and/or orientation output signals.

In some implementations, position and orientation component 21 may be configured to determine a position and/or an orientation of the housing based on the determined position and/or the determined orientation of the landmark, and based on the first motion and/or orientation output signals and the second motion and/or orientation output signals. For example, position and orientation component 21 may be configured to determine a position and/or an orientation of the housing based on the determined position and/or the determined orientation of the landmark, and to adjust the determined position and/or the determined orientation of the landmark based on the first motion and/or orientation output signals and the second motion and/or orientation output signals. Such a determination of the position and/or the orientation of a housing may increase the accuracy of the determined position and/or the determined orientation of the housing.

In some implementations, position and orientation component 21 may be configured to determine a position and/or an orientation of the housing based on a previously determined position and/or a previously determined orientation of the landmark, and based on the first motion and/or orientation output signals and the second motion and/or orientation output signals. For example, position and orientation component 21 may have determined a position and/or an orientation of the housing, and may then determine a new position and/or a new orientation of the housing based on the first motion and/or orientation output signals and the second motion and/or orientation output signals. Such a determination of the new position and/or the new orientation of a housing may allow position and orientation component 21 to avoid any latency arising from determining a position and/or an orientation of a housing based on the visual output signals.

Blade effects component 22 may be configured to select a blade of a bladed weapon. A bladed weapon may be a real weapon, such as a broadsword, an axe, or a katana, or a fictional weapon, such as a lightsaber. In some implementations, blade effects component 22 may be configured to select the blade based on a user input received through an input device. An input device may refer to a device that allows a user to input information. For example, an input device may include a key entry device, a touch entry device, an imaging device, a sound device, and/or other input devices. A user input may refer to one or more information provided by a user through an input device.

A key entry device may include a device that allows a user to provide one or more user inputs by typing one or more of characters, numbers, and/or other symbols. A key entry device may include a separate device or a part of another device. For example, a key entry device may include a keyboard/button coupled to processor 11. As another example, a key entry device may include a mobile device coupled to processor 11. A user may provide one or more user inputs by typing one or more information. For example, a user may provide one or more user inputs by typing one or more of a type, shape, size, color, and/or other information about the blade.

A touch entry device may include a device that allows a user to provide user inputs by touching a user interface of the touch entry device. A touch entry device may include a separate device or a part of another device. For example, a touch entry device may include a touch screen coupled to processor 11. As another example, a touch entry device may include a mobile device coupled to processor 11. A user may provide one or more user inputs by touching one or more portions of the touch entry device corresponding to one or more information. For example, a user may provide one or more user inputs by touching one or more portions of the touch entry device corresponding to one or more of a type, shape, size, color, and/or other information about the blade.

An imaging device may include a device that allows a user to provide user inputs by using an image sensor of the imaging device. An imaging device may include a separate device or a part of another device. For example, an imaging device may include an image sensor coupled to processor 11. As a non-limiting example, an imaging device may include image sensor 13. As another example, an imaging device may include a mobile device coupled to processor 11. A user may provide one or more user inputs by directing the field of view of the imaging device to objects that include information. For example, a user may provide one or more user inputs by directing the field of view of the imaging device to a landmark, an augmented reality marker, and/or other objects that include one or more of a type, shape, size, color, and/or other information about the blade.

A sound device may include a device that allows a user to provide user inputs through voice and/or sounds. A sound device may include a separate device or part of another device. For example, a sound device may include a microphone coupled to processor 11. As another example, a sound device may include a mobile device coupled to processor 11. A user may provide one or more user input by speaking one or more information. For example, a user may provide one or more user inputs by speaking one or more of a type, shape, size, color, and/or other information about the blade.

Figure 4E:
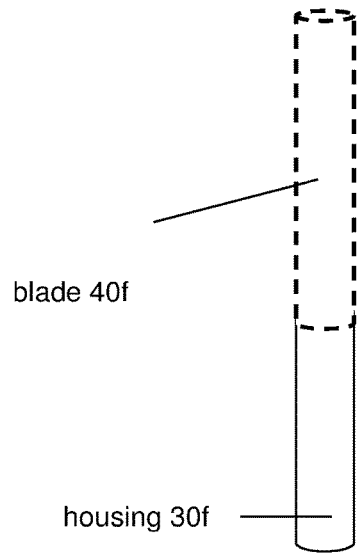

In some implementations, blade effects component 22 may be configured to select the blade based on the landmark. Blade effects component 22 may include or retrieve information (for example, a database, etc.) that matches a landmark to a particular blade. FIGS. 4A-4E illustrate non-limiting examples of blades selected by blade effects component 22 based on landmarks 31. In FIG. 4A, blade effects component 22 may select blade 40a based on landmark 31a. Blade 40a is cylindrical in shape and appears to extend outwardly from top of housing 30a. In FIG. 4B, blade effects component 22 may select blade 40b based on landmark 31b. Blade 40b is cylindrical in shape and appears to extend outwardly from top and bottom of housing 30b. In FIG. 4C, blade effects component 22 may select blade 40c based on landmark 31c and landmark 31d. Blade 40c is curved and appears to extend outwardly from top of housing 30c. Blade 40c curves towards the back of housing 30c, with landmark 31d indicating the back of housing 30c and landmark 31c indicating the front of housing 30c. In FIG. 4D, blade effects component 22 may select blade 40e based on landmark 31e (shown in FIG. 3E). Blade 40e is cylindrical in shape appears to extend outwardly from top of housing 30e. When blade 40e appears on top of housing 30e, landmark 31e may not be not visible. In FIG. 4E, blade effects component 22 may select blade 40f based on landmark 31f (shown in FIG. 3F). Blade 40f is cylindrical in shape appears to extend outwardly from top of housing 30f. When blade 40f appears on top of housing 30f, landmark 31f may not be visible. In some implementations, blade effects component 22 may select blade 40e (shown in FIG. 4D) based on landmark 31f (shown in FIG. 3F) or landmark 31g (shown in FIG. 3G). When blade 40e appears on top of housing 30f, landmark 31f may not be visible. Blade 40e may be longer than landmark 31f. When blade 40e appears on top of housing 30g, landmark 31g may not be visible. Blade 40e may be larger than landmark 31g. Other selections of blades based on landmarks are contemplated.

In some implementations, blade effects component 22 may be configured to select the blade based on remotely received information. For example, system 10 may include a wireless communication device coupled to processor 11, and the wireless communication device may allow blade effects component 22 to receive information relating to a blade from another device. Blade effects component 22 may be configured to select the blade based on the information remotely received from system 10.

For example, blade effects component 22 operating inside a first processor may remotely receive information relating to a blade of a bladed weapon for a second housing. The information relating to the blade for the second housing may include information relating to one or more of a type, shape, size, color, and/or other information about the blade. The information relating to the blade for the second housing may instruct blade effects component 22 to select a particular blade to augment the appearance of the second housing. Such a selection of a blade of a bladed weapon may allow individuals to determine how their individual hilts may appear to be augmented to other individuals.

For example, blade effects component 22 may select blade 40a based on landmark 31a on housing 30a (shown in FIG. 4A). In some implementations, blade effects component 22 may remotely receive information relating to the blade for housing 30a. The remotely received information relating to the blade for housing 30a may indicate that an individual holding housing 30a would like housing 30a to be augmented with blade 40c (shown in FIG. 4C). Blade effects component 22 may select blade 40c for housing 30a if blade effects component 22 is configured to select the blade based on remotely received information.

In some implementations, system 10 may include a haptic generator. Blade effects component 22 may be configured to effectuate operation of the haptic generator in response to a movement of the hilt based on one or more of the visual output signals and/or the second motion and/or orientation output signals. For example, blade effects component 22 may have selected a blade of a lightsaber for a housing of a hilt. Blade effects component 22 may effectuate operation of the haptic generator to produce a light vibration of a lightsaber. Blade effects component 22 may be configured to change the intensity and/or length of the vibration based on the movement of the hilt. Other types of haptic sensations are contemplated.

In some implementations, system 10 may include a speaker. Blade effects component 22 may be configured to effectuate operation of the speaker in response to a movement of the hilt based on one or more of the visual output signals and/or the second motion and/or orientation output signals. For example, blade effects component 22 may have selected a blade of a lightsaber for a housing of a hilt. When the hilt is motionless, blade effects component 22 may effectuate operation of the speaker to produce a buzzing/humming sound of a motionless lightsaber. When the hilt is moving, blade effects component 22 may effectuate operation of the speaker to produce a "wah" sound of a moving lightsaber. Blade effects component 22 may be configured to change the intensity and/or length of the sound based on the movement of the hilt. Other types of sounds and motions are contemplated.

Overlay component 23 may be configured to determine an overlay image. The overlay image may include a blade of a bladed weapon determined by blade effects component 22. The blade may be placed within the overlay image according to the determined position and/or the determined orientation of the housing. The determined position and/or the determined orientation of the housing may change how the blade appears within the overlay image. For example, the determined position and/or the determined orientation of the housing may change one or more of the position, the size, the shape, the tilt, the rotation, and/or other appearances of the blade.

In some implementations, overlay component 23 may place the blade within the overlay image according to a previously determined position and/or a previously determined orientation of the housing, and based on the first motion and/or orientation output signals and the second motion and/or orientation output signals. Overlay component 23 may determine changes in the position and/or the orientation of the blade based on the first motion and/or orientation output signals and the second motion and/or orientation output signals. Overlay component 23 may determine new position and/or the new orientation of the blade based on the previously determined position and/or the previously determined orientation of the housing, and the determined changes in position and/or orientation of the housing. Such a determination of the new position and/or the new orientation of the blade may allow overlay component 23 to avoid any latency arising from determining a position and/or an orientation of a blade based on the visual output signals.

Display component 24 may be configured to effectuate displaying of an overlay image on display 12. The displaying may be effectuated so that the blade appears to be attached to the hilt. In some implementations, display component 24 may be configured to effectuate displaying of an overlay image within one or more of an image, a video, and/or other visual information based on the visual output signals generated by image sensor 13.

In some implementations, display component 24 may be configured to effectuate displaying of an overlay image on display 12, which allows light to be passed through display 12 in portions in which the overlay image does not contain the blade. For example, display 12 may include one or more of an optical head-mounted display and a user of display 12 may see light from the real world as well as the overlay image. In some implementations, display component 24 may be configured to change the transparency of one or more portions of display 12. For example, display component 24 may change the transparency of one or more portions of display 12 corresponding to the blade to block light from the real world passing through display 12.

In some implementations, system 10 may be configured to provide one or more of visual, audio, and/or haptic effects to simulate interactions between a blade and an object. An object may be a physical object or a virtual object. A physical object may refer to an object in the real world. A physical object may include a static object (e.g., a still door, a wall, a rock, etc.) or a dynamic object (e.g., a moving door, a moving target, etc.). A virtual object may refer to an object generated by a computing device, such as processor 11. A virtual object may include a static object (e.g., a virtual force field, a still virtual blade of another hilt, etc.) or a dynamic object (e.g., a moving virtual blade of another hilt, a virtual blaster fire, a virtual moving robot, etc.).

Visual detection component 20 may be configured to detect an object based on the visual output signals. Visual detection component 20 may determine a position and/or an orientation of the object based on visual output signals conveying visual information within the field of view of image sensor 13.

Position and orientation component 21 may be configured to determine when the blade of the bladed weapon touches the object. Position and orientation component 21 may determine when the blade touches the object based on the determined position and/or the determined orientation of the housing, and the determined position and/or the determined orientation of the object. Other implementations to determine when the blade of the bladed weapon touches the objects are contemplated.

Blade effects component 22 may be configured to select one or more visual effects based on the blade touching the object. A visual effect may refer to one or more information that may be observed visually. A visual effect may be static or dynamic, and may be visually observable at a time, over a period of time, at a location, or over a range of locations. A visual effect may include one or more of an image, a video, and/or other visual effects. Overlay component 23 may include in the overlay image the visual effect determined by blade effects component 22. The visual effect may be placed within the overlay image based on the location in which the blade touches the object.

Figure 5:
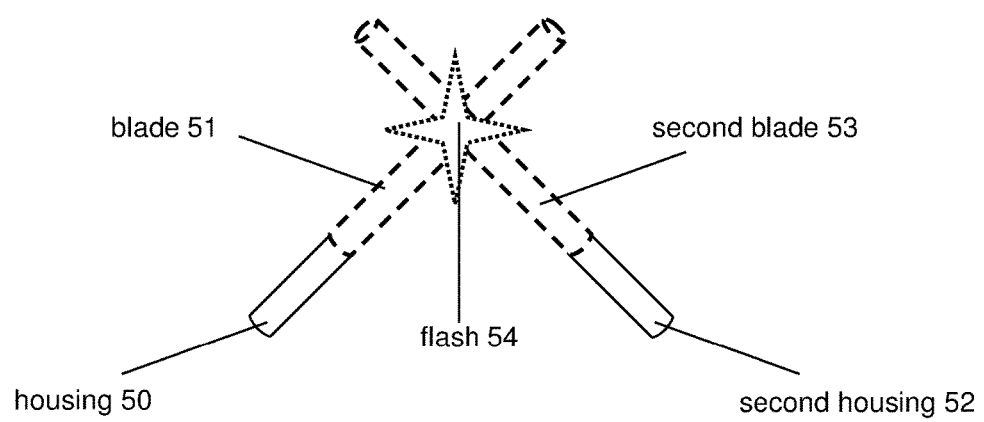
FIG. 5 illustrates an example of a visual effect based on two blades of bladed weapons touching each other.

For example, FIG. 5 shows blade 51 of housing 50 touching second blade 53 of second housing 52. When blade 51 touches second blade 53, blade effects component 22 may select flash 54 as the visual effect. In some implementations, flash 54 may be selected at the moment blade 51 touches second blade 53. In some implementations, flash 54 may be selected for as long as blade 51 touches second blade 53. In some implementations, the size and/or brightness of flash 54 may change based on how blade 51 touches second blade 53. For example, if blade 51 touches second blade 53 slowly, flash 54 may be small and of low brightness. If blade 51 touches second blade 53 quickly, flash 54 may be large and of high brightness.

Figure 6A:
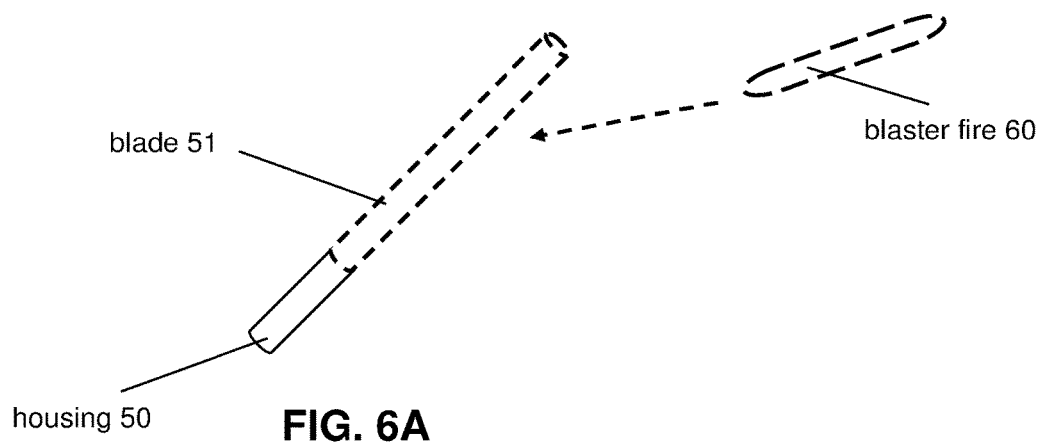
FIGS. 6A-6C illustrate an example of a visual effect based on a blade of a bladed weapon touching a virtual blaster fire.
Figure 6B:
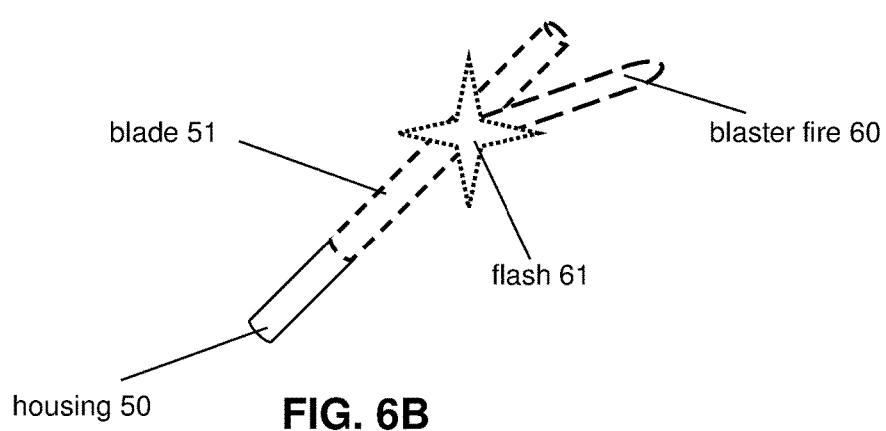
Figure 6C:
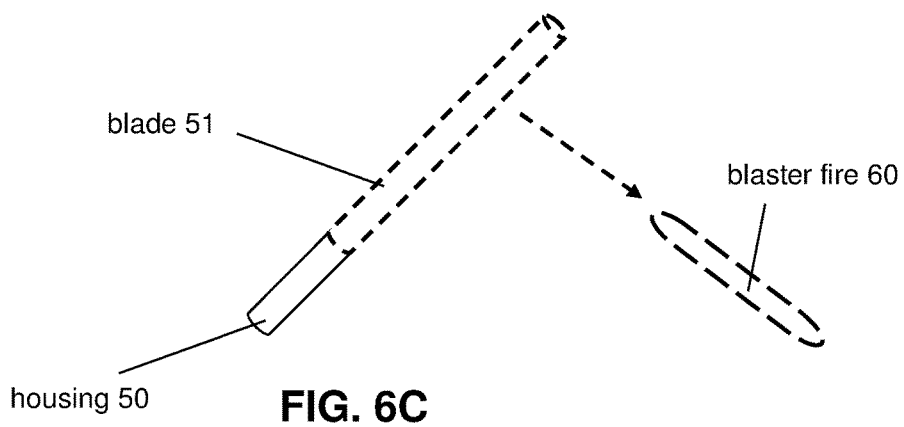

As another example, FIGS. 6A-6C shows blade 51 of housing 50 touching blaster fire 60. Blaster fire 60 may be a virtual blaster fire from a blaster of a stormtrooper. In FIG. 6A, blaster fire 60 is traveling in the direction of blade 51. In FIG. 6B, blaster fire 60 touches blade 51. When blaster fire 60 touches blade 51, blade effects component 22 may select flash 61 as the visual effect. Blade effects component 22 may also select a change in direction of blaster fire 60 as the visual effect. In FIG. 6C, blaster fire 60 has changed directions and is moving away from blade 51, simulating blaster fire 60 being reflected by blade 51. In some implementations, the visual effect may include a change in blaster fire 60 when it hits another object. For example, blaster fire 60 in FIG. 6C may travel back and hit the stormtrooper. When blaster fire 60 hits the stormtrooper, the visual effect may change to show a flash at the point of impact and blaster fire 60 may disappear. As another example, when blaster fire 60 hits the stormtrooper, the visual effect may include a pop-up dialogue from the stormtrooper containing text about being hit by blaster fire 60.

Figure 7A:
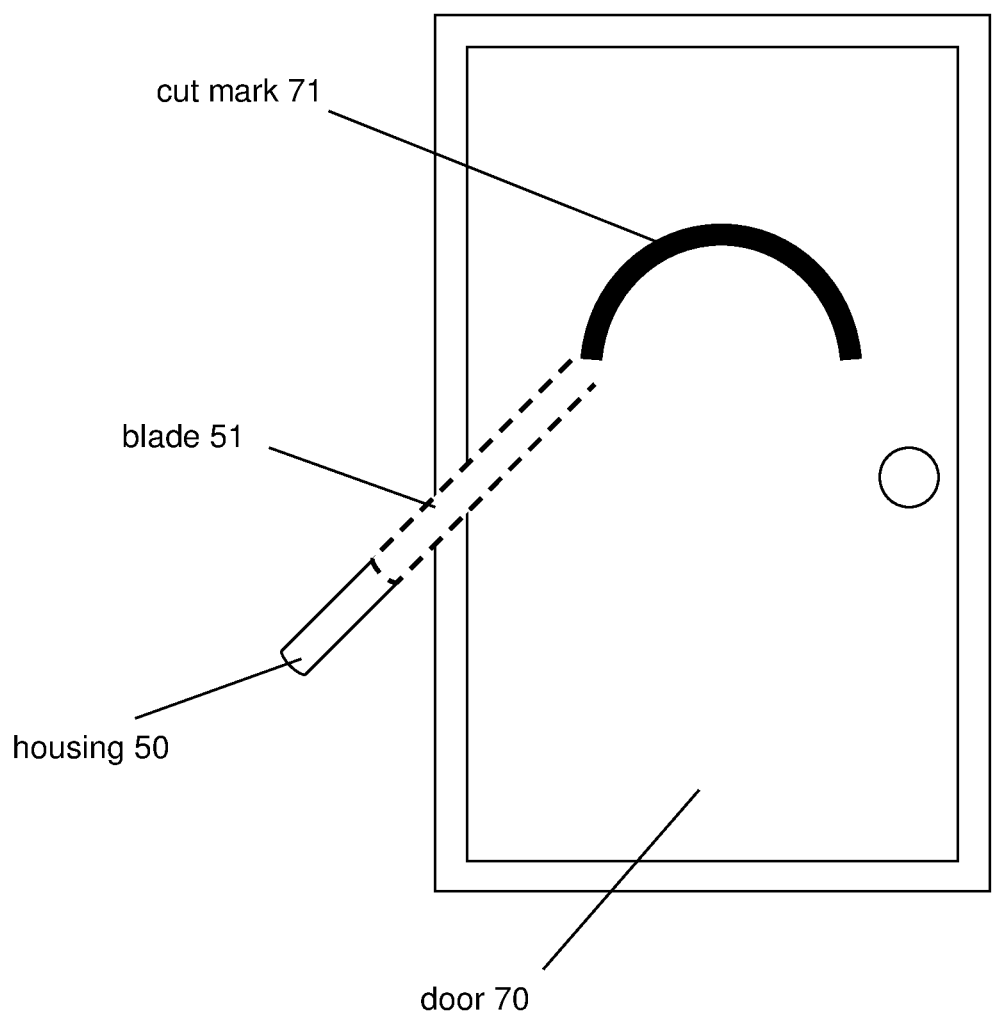
FIGS. 7A-7B illustrate an example of a visual effect based on a blade of a bladed weapon touching a door.
Figure 7B:
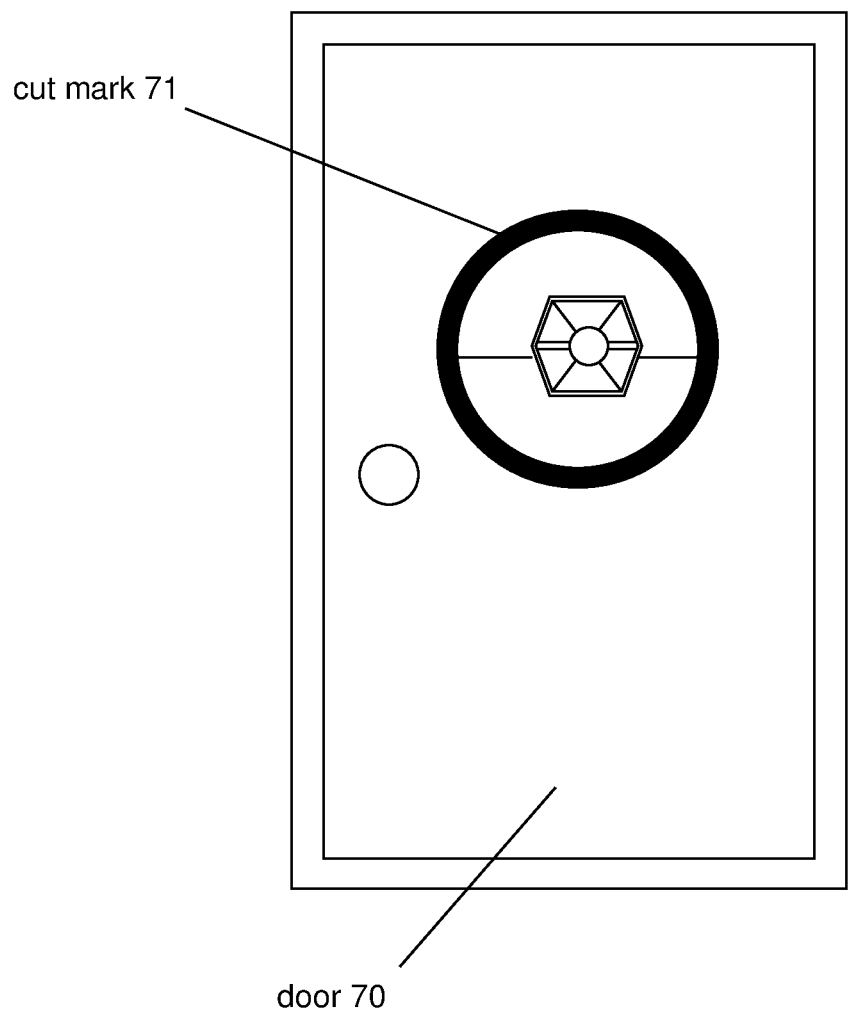

As another example, FIGS. 7A-7B shows blade 51 of housing 50 touching door 70. In FIG. 7A, blade 51 is pushed into door 70 and moved in a circular shape. When blade 51 touches door 70, blade effects component 22 may select cut mark 71 as the visual effect. Cut mark 71 may become longer as blade 51 is moved in a circular shape, with cut mark 71 following the point of contact between blade 51 and door 70. In FIG. 7B, blade 51 has completed its circular motion on door 70 and cut mark 71 appears as a hole in door 70. In some implementations, the visual effect may include a view of the other side of door 70. For example, in FIG. 7B, the visual effect may include a view of a virtual flight deck with a virtual TIE fighter on the other side of door 70.

In some implementations, blade effects component 22 may be configured to select one or more haptic effects based on the blade touching the object. A haptic effect may refer to one or more information that may be observed haptically. A haptic effect may be static or dynamic, and may be haptically observable at a time, over a period of time, at a location, or over a range of locations. A haptic effect may include one or more of a vibration, a motion, a temperature, and/or other haptic effects. For example, in FIG. 5, blade effects component 22 may select an intense vibration when blade 51 touches second blade 53. As another example, in FIG. 6B, blade effects component 22 may select a short vibration when blaster fire 60 touches blade 51. As another example, in FIG. 7A, blade effects component 22 may select a temperature higher than the ambient temperature when blade 51 is pushed into door 70 and moved in a circular shape.

In some implementations, blade effects component 22 may be configured to select one or more audio effects based on the blade touching the object. An audio effect may refer to one or more information that may be observed audibly. An audio effect may be static or dynamic, and may be audibly observable at a time, over a period of time, at a location, or over a range of locations. An audio effect may include one or more of a sound, a music, a word, a sentence, and/or other audio effect. For example, in FIG. 5, blade effects component 22 may select a clashing sound when blade 51 touches second blade 53. As another example, in FIG. 6B, blade effects component 22 may select a blaster reflecting sound when blaster fire 60 touches blade 51. As another example, in FIG. 6C, blade effects component 22 may select a blaster hitting sound and/or yelling by a stormtrooper when blaster fire 60 hits the stormtrooper. As another example, in FIG. 7A, blade effects component 22 may select a cutting sound when blade 51 is pushed into door 70 and moved in a circular shape. As another example, in FIGS. 7A-7B, blade effects component 22 may select a sound of a virtual flight deck.

Although processor 11, display 12, image sensor 13, first motion and orientation sensor 14, second motion and orientation sensor 15, and electronic storage 16 are shown to be connected to a bus 17 in FIG. 1, any communication medium may be used to facilitate interaction between any components of system 10. One or more components of system 10 may communicate with each other through hard-wired communication, wireless communication, or both. For example, processor 11 may wirelessly communicate with second motion and orientation sensor 15. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination.

Processor 11 may be configured to execute one or more of visual detection component 20, position and orientation component 21, blade effects component 22, overlay component 23, display component 24, and/or other components by software; hardware; firmware; some combination of software, hardware, and/or firmware; and/or other mechanisms for configuring processing capabilities on processor 11.

It should be appreciated that although visual detection component 20, position and orientation component 21, blade effects component 22, overlay component 23, and display component 24 are illustrated in FIG. 1 as being co-located within a single processing unit, in implementations in which processor 11 comprises multiple processing units, one or more of visual detection component 20, position and orientation component 21, blade effects component 22, overlay component 23, and/or display component 24 may be located remotely from the other computer program components.

The description of the functionality provided by the different computer program components 20, 21, 22, 23, and/or 24 described herein is for illustrative purposes, and is not intended to be limiting, as any of computer program components 20, 21, 22, 23, and/or 24 may provide more or less functionality than is described. For example, one or more of computer program components 20, 21, 22, 23, and/or 24 may be eliminated, and some or all of its functionality may be provided by other computer program components 20, 21, 22, 23, and/or 24. As another example, processor 11 may be configured to execute one or more additional computer program components that may perform some or all of the functionality attributed to one or more of computer program components 20, 21, 22, 23, and/or 24.

Although image sensor 13 is depicted in FIG. 1 as a single element, this is not intended to be limiting. Image sensor 13 may include one or more image sensors in one or more locations.

Although first motion and orientation sensor 14 and second motion and orientation sensor 15 are depicted in FIG. 1 as single elements, this is not intended to be limiting. First motion and orientation sensor 14 and/or second motion and orientation sensor 15 may include one or more motion and orientation sensors in one or more locations.

Although display 12 is depicted in FIG. 1 as a single element, this is not intended to be limiting. Display 12 may include one or more displays in one or more locations.

The electronic storage media of electronic storage 16 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 16 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 16 may be a separate component within system 10, or electronic storage 16 may be provided integrally with one or more other components of system 10 (e.g., processor 11). Although electronic storage 16 is shown in FIG. 1 as a single entity, this is for illustrative purposes only. In some implementations, electronic storage 16 may comprise a plurality of storage units. These storage units may be physically located within the same device, or electronic storage 16 may represent storage functionality of a plurality of devices operating in coordination.

FIG. 2 illustrates method 200 for augmenting an appearance of a hilt to simulate a bladed weapon. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, visual output signals conveying visual information within a field of view of an image sensor may be generated. Visual information may include one or more of an image, a video, and/or other visual information. In some implementations, operation 201 may be performed by one or more sensors the same as or similar to image sensor 13 (shown in FIG. 1 and described herein).

At operation 202, first motion and/or orientation output signals conveying motion and/or orientation information of a display may be generated. In some implementations, operation 202 may be performed by one or more sensors the same as or similar to first motion and orientation sensor 14 (shown in FIG. 1 and described herein).

At operation 203, second motion and/or orientation output signals conveying motion and/or orientation information of a housing of a hilt may be generated. In some implementations, operation 203 may be performed by one or more sensors the same as or similar to second motion and orientation sensor 15 (shown in FIG. 1 and described herein).

If a landmark is within the field of view of the image sensor, the method proceeds to operation 204. At operation 204, a landmark associated with the hilt that is within the field of view of the image sensor may be detected. The landmark may be detected based on the visual output signals. The landmark may indicate a reference point for the hilt that facilitates determination of the position and/or the orientation of the hilt. In some implementations, operation 204 may be performed by a processor component the same as or similar to visual detection component 20 (shown in FIG. 1 and described herein).

At operation 205, a position and/or an orientation of the landmark may be determined. In some implementations, operation 205 may be performed by a processor component the same as or similar to visual detection component 20 (shown in FIG. 1 and described herein).

At operation 206, a position and/or an orientation of the housing may be determined based on the determined position and/or the determined orientation of the landmark. In some implementations, operation 206 may be performed by a processor component the same as or similar to position and orientation component 21 (shown in FIG. 1 and described herein).

If a landmark is not within the field of view of the image sensor, the method proceeds to operation 207. At operation 207, a position and/or an orientation of the housing may be determined based on the first motion and/or orientation output signals and the second motion and/or orientation output signals. In some implementations, operation 207 may be performed by a processor component the same as or similar to position and orientation component 21 (shown in FIG. 1 and described herein).

In some implementations, a position and/or an orientation of the housing may be determined based on the visual output signals, the first motion and/or orientation output signals, and the second motion and/or orientation output signals. In some implementations, such operation may be performed by a processor component the same as or similar to position and orientation component 21 (shown in FIG. 1 and described herein).

At operation 208, an overlay image comprising a blade of a bladed weapon may be determined. The blade may be placed within the overly image according to the determined position and/or the determined orientation of the housing. In some implementations, operation 208 may be performed by a processor component the same as or similar to overlay component 23 (shown in FIG. 1 and described herein).

At operation 209, the overlay image may be displayed on a display so that the blade appear to be attached to the hilt. In some implementations, operation 209 may be performed by a processor component the same as or similar to display component 24 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for augmenting an appearance of a hilt to simulate a handheld weapon, the system comprising:
a display configured to display an overlay image;
an image sensor configured to generate visual output signals conveying visual information within a field of view of the image sensor;
a housing of the hilt;
a landmark carried by the housing, the landmark indicating a reference point for the hilt that facilitates determination of a position and orientation of the housing;
a first inertial measurement unit carried by the display, the first inertial measurement unit configured to generate first motion and/or orientation output signals conveying motion and/or orientation information of the display such that the first motion and/or orientation output signals are separate and independent from the visual output signals, wherein the first motion and/or orientation output signals facilitate determination of the position and orientation of the housing when the landmark is not within the field of view of the image sensor;
a second inertial measurement unit carried by the housing, the second inertial measurement unit configured to generate second motion and/or orientation output signals conveying motion and/or orientation information of the housing such that the second motion and/or orientation output signals are separate and independent from the visual output signals, wherein the second motion and/or orientation output signals facilitate determination of the position and orientation of the housing when the landmark is not within the field of view of the image sensor; and
one or more processors configured by machine readable instructions to:
when the landmark is within the field of view of the image sensor:
detect the landmark based on the visual output signals;
determine a position and/or an orientation of the landmark; and
determine a position and/or an orientation of the housing based on the determined position and/or the determined orientation of the landmark;
when the landmark is not within the field of view of the image sensor, determine the position and/or the orientation of the housing with respect to the display based on the first motion and/or orientation output signals and the second motion and/or orientation output signals;
determine the overlay image comprising a visual of the handheld weapon, wherein the visual is placed within the overlay image according to the determined position and/or the determined orientation of the housing such that the visual is placed within the overlay image based on the visual output signals when the landmark is within the field of view of the image sensor and the visual is placed within the overlay image based on the first motion and/or orientation output signals and the second motion and/or orientation output signals when the landmark is not within the field of view of the image sensor; and effectuate displaying of the overlay image on the display.

2. The system of claim 1, wherein the one or more processors are further configured to:
   detect an object based on the visual output signals;
   determine when the visual of the handheld weapon touches the object;
   determine the overlay image to further include a visual effect based on the visual of the handheld weapon touching the object.

3. The system of claim 1, further comprising a haptic generator, wherein the one or more processors are further configured to effectuate operation of the haptic generator in response to a movement of the hilt based on one or more of the visual output signals and/or the second motion and/or orientation output signals.

4. The system of claim 1, further comprising a speaker, wherein the one or more processors are further configured to effectuate operation of the speaker in response to a movement of the hilt based on one or more of the visual output signals and/or the second motion and/or orientation output signals to simulate one or more sounds of the handheld weapon such that the one or more sounds of the handheld weapon are simulated based on the second motion and/or orientation output signals when the landmark is not within the field of view of the image sensor.

5. The system of claim 1, wherein the landmark includes a light emitting diode.

6. The system of claim 1, wherein the first inertial measurement unit and the second inertial measurement unit include one or more of an accelerometer, a gyroscope, and/or a magnetometer used to generate the first motion and/or orientation output signals and the second motion and/or orientation output signals.

7. The system of claim 1, wherein the one or more processors are further configured to select the visual based on a user input received through an input device.

8. The system of claim 1, wherein the one or more processors are further configured to:
   identify a given type of the landmark, the given type of the landmark associated with a given type of visual; and
   select the visual based on the given type of the landmark.

9. The system of claim 1, wherein the one or more processors are further configured to select the visual based on remotely received information.

10. The system of claim 1, wherein the display comprises one or more of a head-mounted display, an optical head-mounted display, a see-through display, an optical see-through display, a video see-through display, a visor, eyeglasses, sunglasses, a smartphone, a tablet, a mobile device, and/or a projector.

11. The system of claim 1, wherein the image sensor and the one or more processors are carried on the display, and wherein the field of view of the image sensor is a function of the position and the orientation of the display.

12. A method for augmenting an appearance of a hilt to simulate a handheld weapon, the method comprising:
   generating visual output signals conveying visual information within a field of view of an image sensor;
   generating first motion and/or orientation output signals conveying motion and/or orientation information of a display, the first motion and/or orientation output signals generated by a first inertial measurement unit carried by the display, wherein the first motion and/or orientation output signals are separate and independent from the visual output signals and the first motion and/or orientation output signals facilitate determination of the position and orientation of the housing when the landmark is not within the field of view of the image sensor;
   generating second motion and/or orientation output signals conveying motion and/or orientation information of a housing of the hilt, the second motion and/or orientation output signals generated by a second inertial measurement unit carried by the housing, wherein the second motion and/or orientation output signals are separate and independent from the visual output signals and the second motion and/or orientation output signals facilitate determination of the position and orientation of the housing when the landmark is not within the field of view of the image sensor;
   when a landmark is within the field of view of the image sensor:
      detecting the landmark based on the visual output signals, wherein the landmark is carried by the housing and indicates a reference point for the hilt that facilitates determination of a position and orientation of the housing;
      determining a position and/or an orientation of the landmark; and
      determining a position and/or an orientation of the housing based on the determined position and/or the determined orientation of the landmark;
   when the landmark is not within the field of view of the image sensor, determining the position and/or the orientation of the housing with respect to the display based on the first motion and/or orientation output signals and the second motion and/or orientation output signals;
   determining an overlay image comprising a visual of the handheld weapon, wherein the visual is placed within the overlay image according to the determined position and/or the determined orientation of the housing such that the visual is placed within the overlay image based on the visual output signals when the landmark is within the field of view of the image sensor and the visual is placed within the overlay image based on the first motion and/or orientation output signals and the second motion and/or orientation output signals when the landmark is not within the field of view of the image sensor; and
   effectuating displaying of the overlay image on the display.

13. The method of claim 12, further comprising:
   detecting an object based on the visual output signals;
   determining when the visual of the handheld weapon touches the object;
   determining the overlay image to further include a visual effect based on the visual of the handheld weapon touching the object.

14. The method of claim 12, further comprising effectuating operation of a haptic generator in response to a movement of the hilt based on one or more of the visual output signals and/or the second motion and/or orientation output signals.

15. The method of claim 12, further comprising effectuating operation of a speaker in response to a movement of the hilt based on one or more of the visual output signals and/or the second motion and/or orientation output signals to simulate one or more sounds of the handheld weapon such that the one or more sounds of the handheld weapon are simulated based on the second motion and/or orientation output signals when the landmark is not within the field of view of the image sensor.

16. The method of claim 12, wherein the landmark includes a light emitting diode.

17. The method of claim 12, further comprising selecting the visual based on a user input received through an input device.

18. The method of claim 12, further comprising:
    identifying a given type of the landmark, the given type of the landmark associated with a given visual; and
    selecting the visual based on the given type of the landmark.

19. The method of claim 12, further comprising selecting the visual based on remotely received information.

20. The method of claim 12, wherein the display comprises one or more of a head-mounted display, an optical head-mounted display, a see-through display, an optical see-through display, a video see-through display, a visor, eyeglasses, sunglasses, a smartphone, a tablet, a mobile device, and/or a projector.

* * * * *